United States Patent
Fukami et al.

(10) Patent No.: US 8,416,167 B2
(45) Date of Patent: Apr. 9, 2013

(54) ACTIVE MATRIX LIQUID CRYSTAL DISPLAY DEVICE INCLUDING A TRANSITION-NUCLEUS FORMATION SECTION

(75) Inventors: Tetsuo Fukami, Ishikawa-gun (JP); Midori Tsukane, Kanazawa (JP); Kenji Nakao, Kanazawa (JP)

(73) Assignee: Japan Display Central Inc., Fukaya-shi (JP)

( * ) Notice: Subject to any disclaimer, the term of this patent is extended or adjusted under 35 U.S.C. 154(b) by 1036 days.

(21) Appl. No.: 11/753,175

(22) Filed: May 24, 2007

(65) Prior Publication Data

US 2007/0273634 A1 Nov. 29, 2007

(30) Foreign Application Priority Data

May 26, 2006 (JP) ................................. 2006-146447

(51) Int. Cl.
G09G 3/36 (2006.01)
(52) U.S. Cl. .......................................... 345/90; 349/126
(58) Field of Classification Search ...................... 345/98, 345/214, 90, 92; 349/33, 126
See application file for complete search history.

(56) References Cited

U.S. PATENT DOCUMENTS

| | | | |
|---|---|---|---|
| 6,671,009 B1* | 12/2003 | Hattori et al. | 349/33 |
| 6,933,916 B2* | 8/2005 | Nakao et al. | 345/98 |
| 7,737,934 B2* | 6/2010 | Shih et al. | 345/94 |
| 2004/0125251 A1* | 7/2004 | Kim | 349/43 |
| 2005/0036096 A1* | 2/2005 | Takatori et al. | 349/156 |
| 2005/0140637 A1* | 6/2005 | Yi | 345/98 |
| 2005/0259062 A1* | 11/2005 | Senda et al. | 345/98 |
| 2006/0274011 A1* | 12/2006 | Igarashi et al. | 345/94 |

FOREIGN PATENT DOCUMENTS

| | | |
|---|---|---|
| JP | 2001-290127 | 10/2001 |
| JP | 2002-357808 | 12/2002 |
| JP | 2003-107478 | 4/2003 |

OTHER PUBLICATIONS

U.S. Appl. No. 11/689,738, filed Mar. 22, 2007, Fukami, et al.

* cited by examiner

*Primary Examiner* — Chanh Nguyen
*Assistant Examiner* — Kwang-Su Yang
(74) *Attorney, Agent, or Firm* — Oblon, Spivak, McClelland, Maier & Neustadt, L.L.P.

(57) ABSTRACT

A liquid crystal display device of an OCB mode includes a liquid crystal layer held between an array substrate and a counter-substrate, and a display section composed of display pixels arrayed in a matrix. The array substrate includes pixel electrodes which are disposed in association with the display pixels. The counter-substrate includes a counter-electrode opposed to the pixel electrodes. The substrates include a pair of alignment films which are disposed on the pixel electrodes and the counter-electrode, respectively, and are subjected to rubbing treatment to control an alignment state of liquid crystal molecules included in the layer. A transition-nucleus formation section, which generates an electric field for transitioning the alignment state of the liquid crystal molecules included in the layer from a non-display state to a display state, is provided on a terminal-end side of a rubbing direction of each of the alignment films in each of the display pixels.

13 Claims, 17 Drawing Sheets

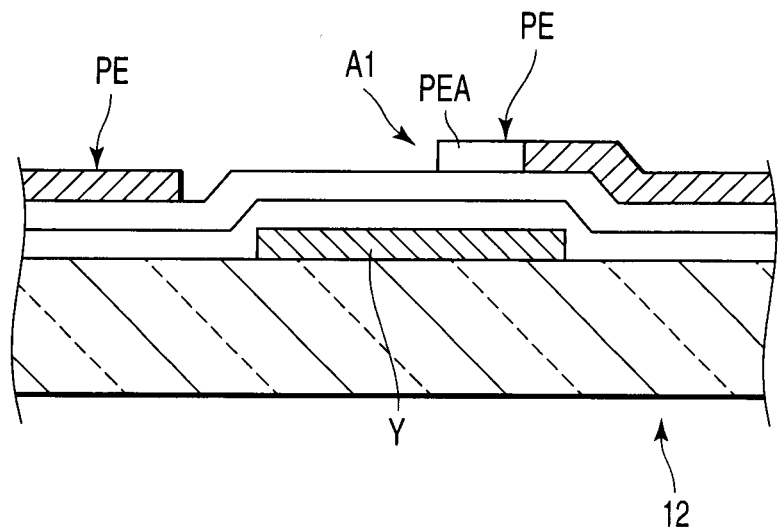
F I G. 10
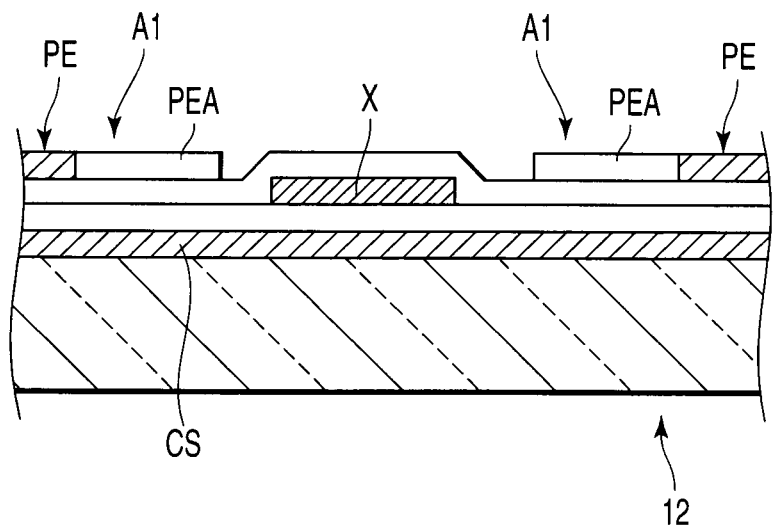
F I G. 12

ACTIVE MATRIX LIQUID CRYSTAL DISPLAY DEVICE INCLUDING A TRANSITION-NUCLEUS FORMATION SECTION

CROSS-REFERENCE TO RELATED APPLICATIONS

This application is based upon and claims the benefit of priority from prior Japanese Patent Application No. 2006-146447, filed May 26, 2006, the entire contents of which are incorporated herein by reference.

BACKGROUND OF THE INVENTION

1. Field of the Invention

The present invention relates generally to a liquid crystal display device, and more particularly to an active-matrix liquid crystal display device.

2. Description of the Related Art

In general, a liquid crystal display device includes a liquid crystal display panel having a display section which is composed of display pixels that are arrayed in a matrix. The liquid crystal display panel includes a pair of mutually opposed substrates, i.e. an array substrate and a counter-substrate, and a liquid crystal layer which is held between the paired substrates.

The array substrate includes pixel electrodes which are disposed in association with the plural display pixels. The counter-substrate includes a counter-electrode which is opposed to the plural pixel electrodes.

An OCB (Optically Compensated Bend) mode liquid crystal display device, compared to, e.g. a TN mode liquid crystal display device, has such features as a high responsivity and a wide viewing angle. Hence, the OCB mode liquid crystal display device is suited, for example, to liquid crystal TVs, the market of which is expected to steadily increase in the years to come.

In the OCB mode liquid crystal display device, when no voltage is applied to the liquid crystal layer, the liquid crystal molecules included in the liquid crystal layer are aligned in a splay alignment state which is a non-display state. When the OCB mode liquid crystal display device is activated, it is necessary to initialize the OCB mode liquid crystal display device by changing ("transitioning") the alignment state of liquid crystal molecules from the non-display alignment state (splay alignment) to a display alignment state (bend alignment).

There has been proposed a liquid crystal display device in which a horizontal electric field is generated between neighboring pixel electrodes to facilitate, prior to displaying an image, the transition of the alignment state of liquid crystal molecules from the non-display alignment state to the display alignment state, thereby quickly displaying an image (see Jpn. Pat. Appln. KOKAI Publication No. 2002-357808).

At the time of the transition, the transition of the alignment state of liquid crystal molecules progresses most quickly in a direction opposite to the rubbing direction of alignment films which are provided on the pixels electrodes and the counter-electrode. In the above-described liquid crystal display device, however, no consideration has been given to the rubbing direction of the alignment films. Depending on a position from which the transition begins, there may be a case in which a considerable length of time is needed from when the transition begins to when the initialization is completed. In the case of a display panel with a large pixel size, a longer time may be needed until the initialization is completed.

In particular, in a low-temperature environment, the viscosity of the liquid crystal material increases, and the time that is needed for the initialization may further be increased.

BRIEF SUMMARY OF THE INVENTION

The present invention has been made in consideration of the above-described problems, and the object of the invention is to decrease a time that is needed for initialization in an OCB mode liquid crystal display device.

According to an aspect of the present invention, there is provided a liquid crystal display device of an OCB mode, comprising a liquid crystal layer held between a first substrate and a second substrate, and a display section composed of a plurality of display pixels arrayed in a matrix, wherein the first substrate includes a plurality of pixel electrodes which are disposed in association with the plurality of display pixels, the second substrate includes a counter-electrode which is opposed to the plurality of pixel electrodes, the first substrate and the second substrate include a pair of alignment films which are disposed on the pixel electrodes and the counter-electrode, respectively, and are subjected to rubbing treatment to control an alignment state of liquid crystal molecules included in the liquid crystal layer, and a transition-nucleus formation section, which generates an electric field for transitioning the alignment state of the liquid crystal molecules included in the liquid crystal layer from a non-display state to a display state, is provided on a terminal-end side of a rubbing direction of each of the alignment films in each of the display pixels.

The present invention can provide a liquid crystal display device which is capable of decreasing a time that is needed for initialization in an OCB mode liquid crystal display device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a cross-sectional view, taken along line X-X in FIG. 9, which schematically shows an example of the cross section of the display pixel shown in FIG. 9;

FIG. 12 is a cross-sectional view, taken along line XII-XII in FIG. 11, which schematically shows an example of the cross section of the display pixel shown in FIG. 11;

DETAILED DESCRIPTION OF THE INVENTION

Figure 1:
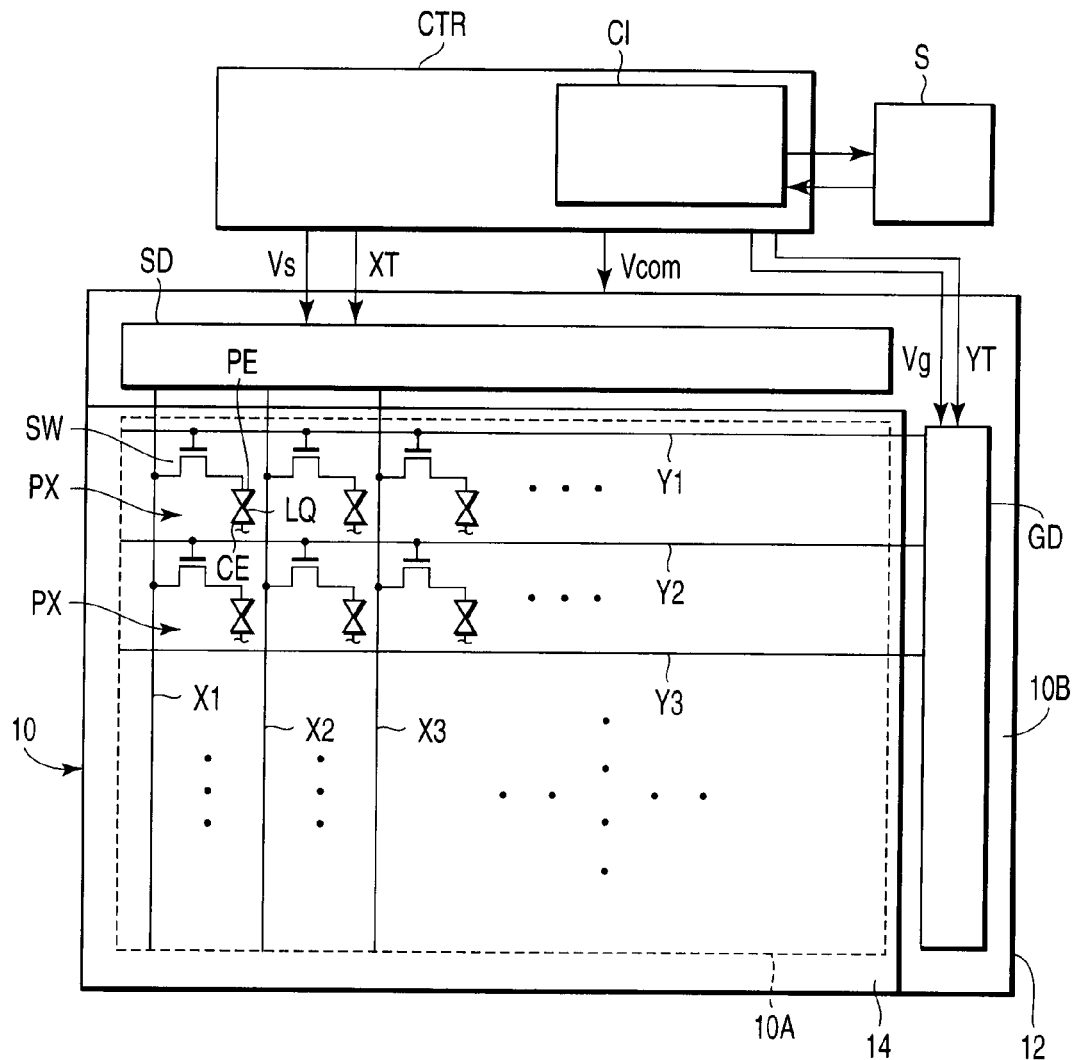
FIG. 1 schematically shows the structure of a liquid crystal display device according to a first embodiment of the present invention.

A liquid crystal display device according to a first embodiment of the present invention will now be described with reference to the accompanying drawings. As shown in FIG. 1, the liquid crystal display device according to this embodiment includes a substantially rectangular, flat liquid crystal display panel 10. The liquid crystal display panel 10 includes a pair of mutually opposed substrates, i.e. an array substrate 12 and a counter-substrate 14. A liquid crystal layer LQ is held between the array substrate 12 and counter-substrate 14.

The liquid crystal display panel 10 includes a display section 10A which is composed of a plurality of display pixels PX that are arrayed in a matrix, and a peripheral section 10B which is provided around the display section 10A.

In the display section 10A, a plurality of scanning lines Y (Y1 to Ym) are disposed along the rows in which the plural display pixels PX are arranged, and a plurality of signal lines X (X1 to Xn) are disposed along the columns in which the plural display pixels PX are arranged. The plural scanning lines Y are connected to a scanning line driving circuit GD which is disposed in the peripheral section 10B. The plural signal lines X are connected to a signal line driving circuit SD which is disposed in the peripheral section 10B.

Figure 2:
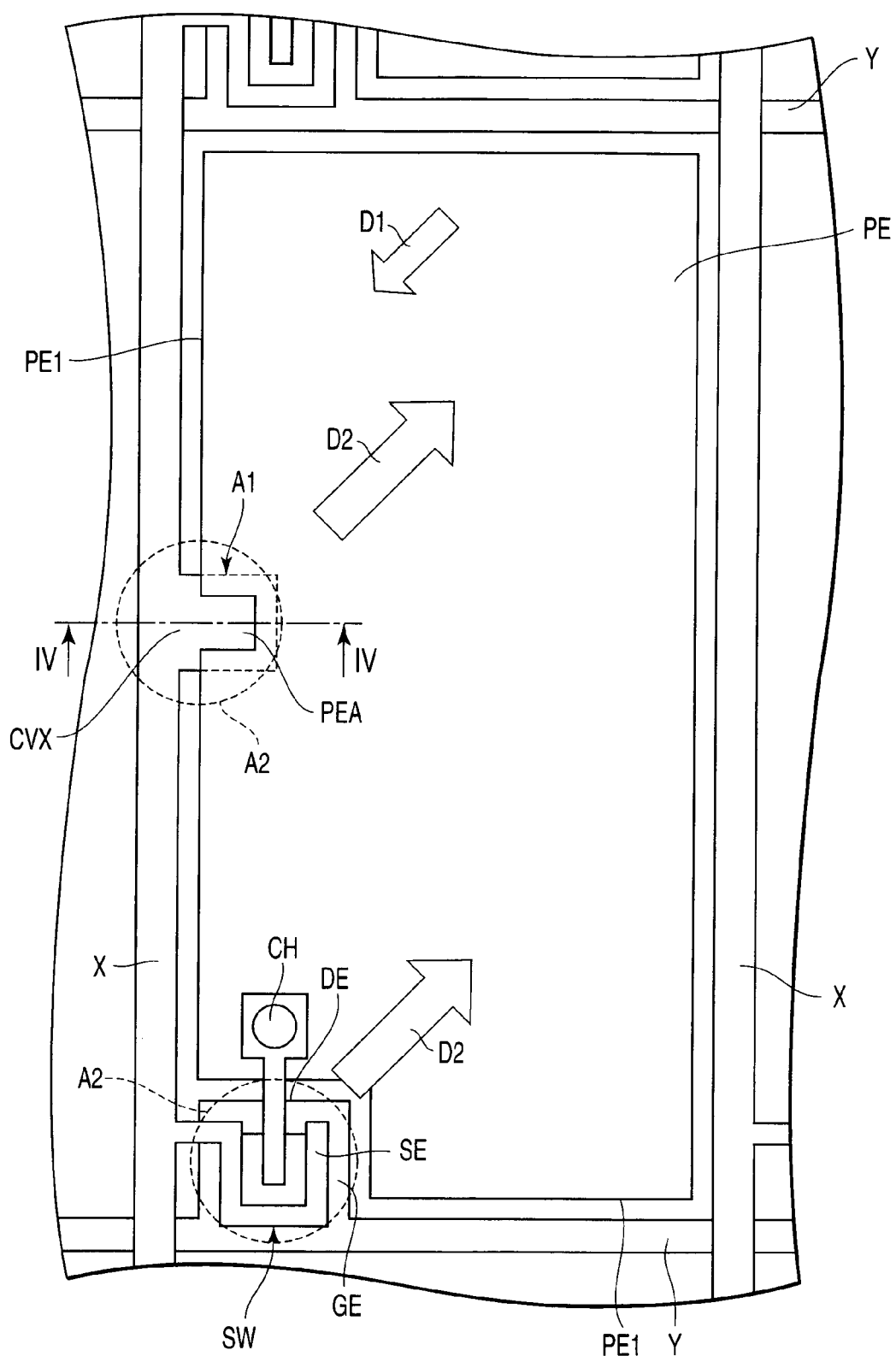
FIG. 2 is a view for describing an example of the structure of a display pixel of the liquid crystal display device shown in FIG. 1.

Each of the display pixels PX includes a pixel switch SW which is formed of, e.g. a thin-film transistor (TFT) on the array substrate 12. As is shown in FIG. 2, a gate electrode GE of the pixel switch SW is connected to the associated scanning line Y (or integrally formed with the associated scanning line Y). A source electrode SE of the pixel switch SW is connected to the associated signal line X (or integrally formed with the associated signal line X). A drain electrode DE of the pixel switch SW is connected via a contact hole CH to a pixel electrode PE which is disposed in each display pixel PX on the array substrate 12.

In the present embodiment, the pixel electrode PE has a substantially rectangular shape and is disposed so as to be opposed to a counter-electrode CE which is disposed on the counter-substrate 14. A pair of alignment films (not shown), which are subjected to rubbing treatment to control the alignment state of liquid crystal molecules included in the liquid crystal layer LQ, are disposed on the pixel electrodes PE and counter-electrode CE. In the liquid crystal display device according to the present embodiment, the alignment film is rubbed in a direction D1 shown in FIG. 2.

As is shown in FIG. 2, in each display pixel, a transition-nucleus formation section A1 for forming a transition nucleus A2 for transitioning the alignment state of liquid crystal molecules included in the liquid crystal layer LQ is provided on a terminal-end side of the rubbing direction D1 of the alignment film. In the case of the present embodiment, the transition-nucleus formation section A1 is provided on a long side edge portion of the rectangular display pixel PX.

Figure 4:
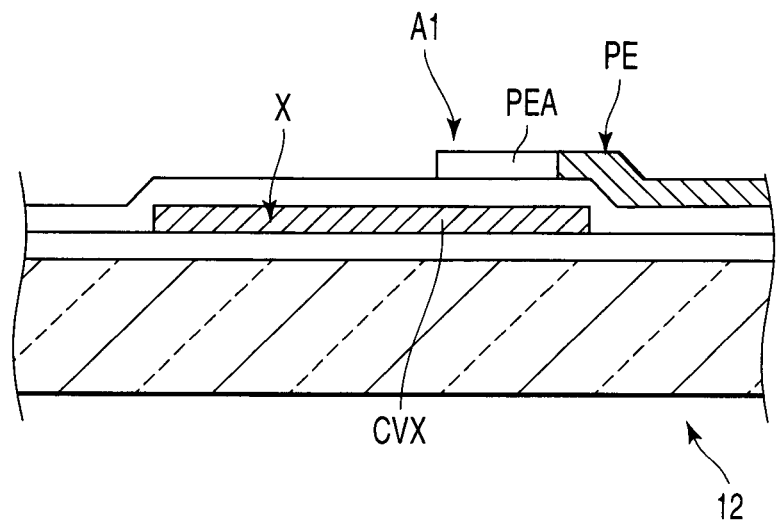
FIG. 4 is a cross-sectional view, taken along line IV-IV in FIG. 2, which schematically shows an example of the cross section of the display pixel shown in FIG. 2.

The transition-nucleus formation section A1 is composed of a recess portion PEA of the pixel electrode PE, and a wiring line, namely, the signal line X, which has a potential different from the potential of the pixel electrode PE. Specifically, as shown in FIG. 2 and FIG. 4, in the transition-nucleus formation section A1, the pixel electrode PE has the substantially rectangular recess portion PEA at an edge portion PE1 which is located on the terminal-end side of the rubbing direction D1. The signal line X has a projection portion CVX which extends towards the edge portion PE1 of the pixel electrode PE. The recess portion PEA of the pixel electrode PE and the projection portion CVX of the signal line X are disposed to be, at least partly, opposed to each other via an insulating layer.

Figure 3:
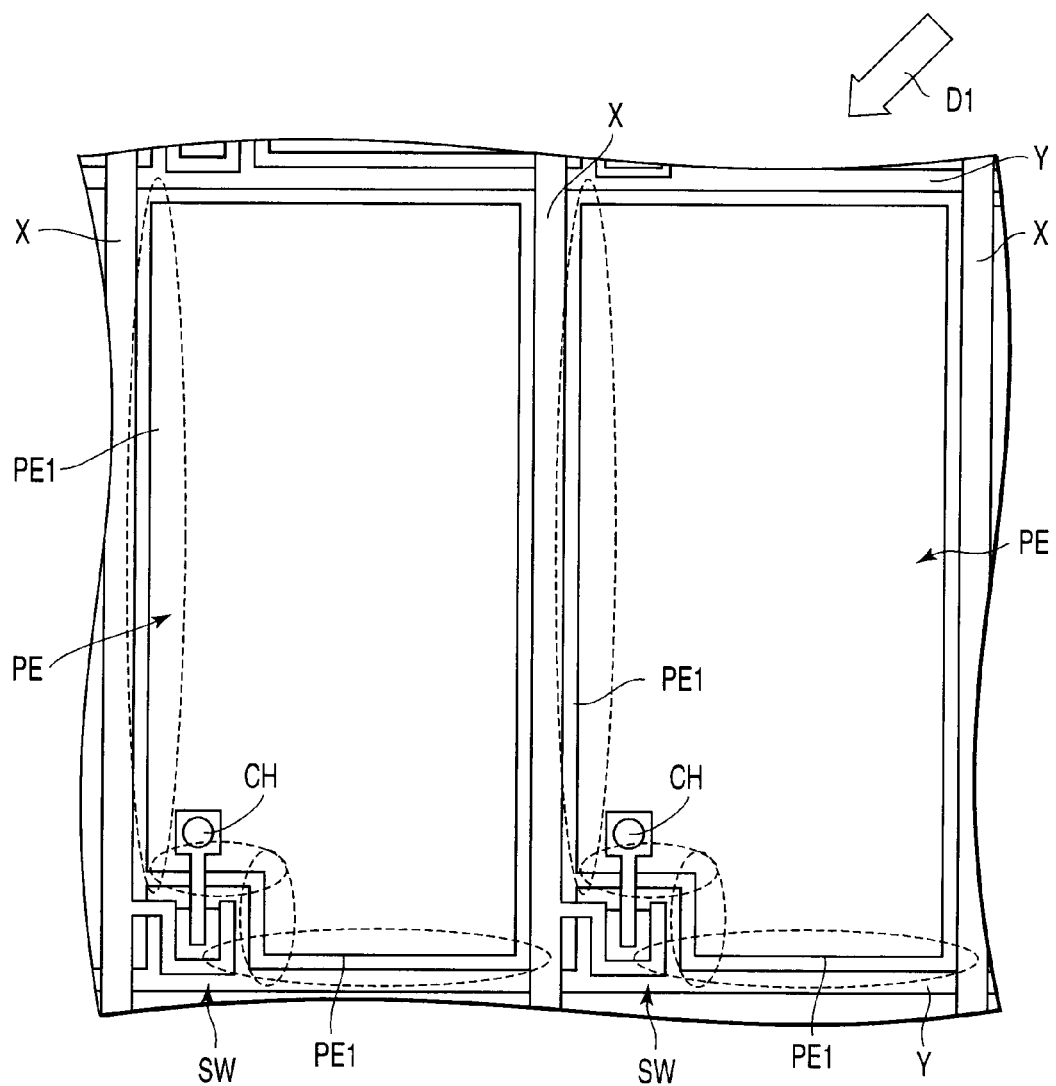
FIG. 3 is a view for describing a terminal-end-side edge portion in a rubbing direction of the display pixel shown in FIG. 2.

As shown in FIG. 3, the edge portion PE1 on the terminal-end side of the rubbing direction D1 is that one of the edge portions of the pixel electrode PE, which crosses the rubbing direction D1 at a second time or following time. To be more specific, in the case of the present embodiment, the edge portion PE1 on the terminal-end side of the rubbing direction D1 is an edge portion neighboring the pixel switch SW. In the present embodiment, the recess portion PEA of the pixel electrode PE is positioned at the edge portion PE1 that is a long side of the pixel electrode PE and is located on the terminal-end side of the rubbing direction D1.

Figure 5:
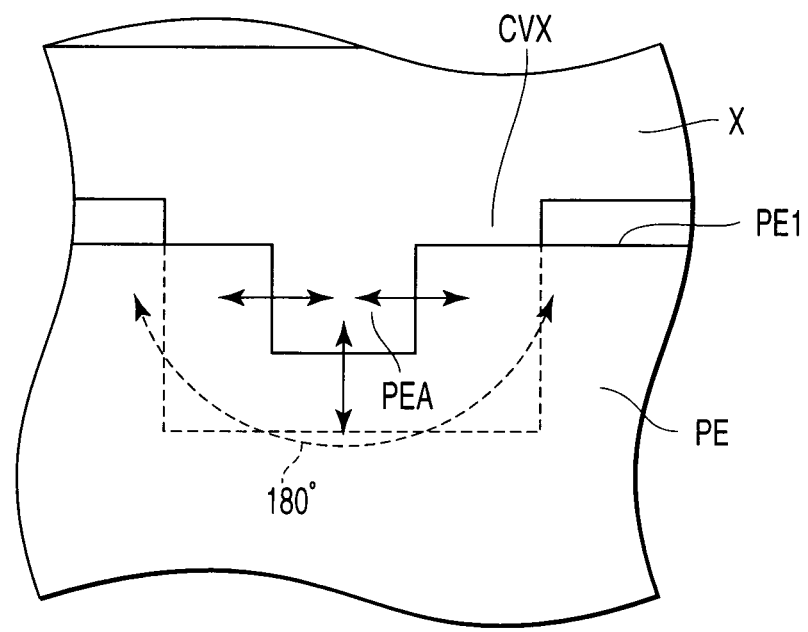
FIG. 5 is a view for describing an example of the structure of a transition-nucleus formation section of the display pixel shown in FIG. 2.

If the recess portion PEA of the pixel electrode PE and the projection portion CVX of the signal line X are disposed as described above, an electric field is generated between the recess portion PEA of the pixel electrode PE and the projection portion CVX of the signal line X, as shown in FIG. 5, when the pixel electrode PE and the signal line X have different potentials. This electric field is generated in a plane, which is substantially parallel to the planar direction of the pixel electrode PE, and in directions substantially perpendicular to the end sides of the recess portion PEA. In other words, an electric field is generated in a plane that is different from a plane of an electric field which is generated between the pixel electrode PE and counter-electrode CE. In the case of the present embodiment, the electric field is generated in the range of 180° along the end sides of the recess portion PEA.

If the electric field is generated in the liquid crystal layer LQ, the liquid crystal molecules which are present near the electric field are aligned in the direction of the electric field. In this case, if the electric field is generated in the directions substantially perpendicular to the end sides of the recess portion PEA in the range of 180° along the end sides of the recess portion PEA, as in the present embodiment, this means that the electric field in the direction different from the direction of the electric field, which occurs between the pixel electrode PE and counter-electrode CE, is locally generated. In the region where this electric field is generated, the alignment state of liquid crystal molecules tends to easily change.

Figure 6:
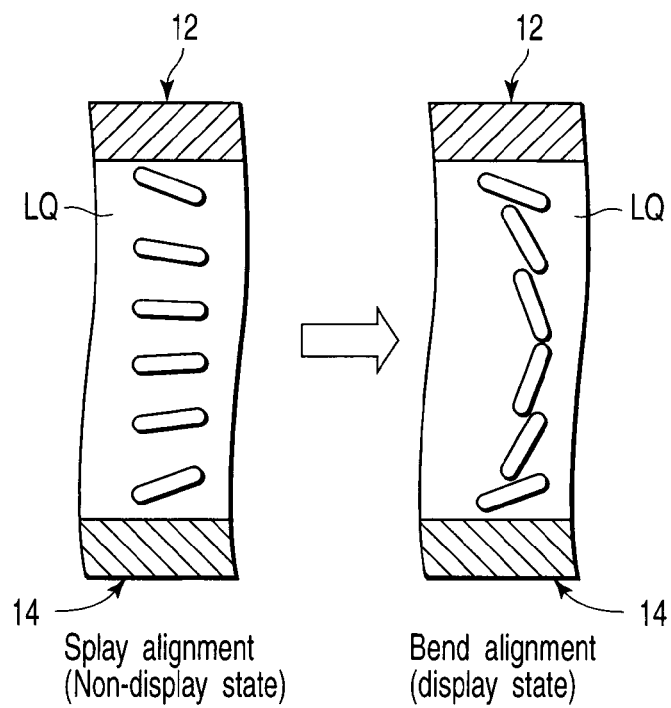
FIG. 6 is a view for explaining a variation of the alignment state of liquid crystal molecules at a time of initializing an OCB mode liquid crystal display device.

Thus, at the time of initialization, the transition nucleus A2 for changing, as shown in FIG. 6, the alignment state of liquid crystal molecules from the non-display state (splay alignment) to the display state (bend alignment) is formed by the transition-nucleus formation section A1.

Furthermore, in the case of FIG. 2, an electric field similarly occurs between the pixel electrode PE and the pixel switch SW in the region where the pixel switch SW is disposed, and the transition nucleus A2 is formed there. Therefore, in the case of the present embodiment, the transition nuclei A2 are formed at two locations, that is, the location where the recess portion PEA of the pixel electrode PE overlaps the projection portion of the signal line X, and the location of the pixel switch SW. By these transition nuclei A2, the transition of liquid crystal molecules is facilitated at the time of initialization.

Figure 7:
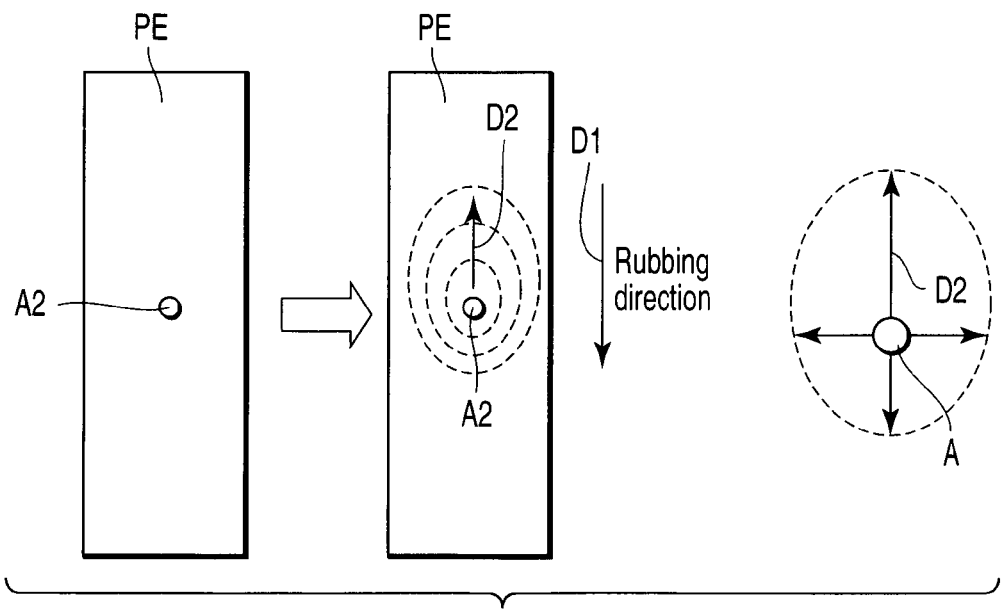
FIG. 7 is a view for explaining the relationship between the variation of the alignment state of liquid crystal molecules shown in FIG. 6 and a rubbing direction of an alignment film.

As shown in FIG. 7, in the case where the transition nucleus occurs in the display pixel PX, the speed of progress of the transition in the display pixel is highest in a direction opposite to the rubbing direction D1. Specifically, the speed of progress of the transition is highest in the direction D2 opposite to the rubbing direction D1.

Hence, in each display pixel PX, by forming the transition nucleus A2 on the terminal-end side of the rubbing direction D1, as described above, the direction D2 of progress of the transition becomes a direction traversing the display pixel PX and the transition of the alignment state of liquid crystal molecules progresses at high speed.

As shown in FIG. 1, the liquid crystal display device according to the embodiment includes a controller CTR which controls the signal line driving circuit SD and the scanning line driving circuit GD, and a sensor S for measuring the temperature of the outside of the liquid crystal display device. The controller CTR includes an initialization control unit CI which controls a voltage to be applied to the liquid crystal layer LQ on the basis of a measurement result obtained from the sensor S, when the liquid crystal display device is activated.

The controller CTR controls the scanning line driving circuit GD, thereby selecting the scanning lines Y in accordance with a timing signal YT. Specifically, the scanning lines Y are successively selected by a scanning signal Vg which is output from the scanning line driving circuit GD. If the scanning line Y is selected, the pixel switches SW that are connected to the selected scanning line Y are turned on. The controller CTR controls the signal line driving circuit SD and causes the signal line driving circuit SD to output image data Vs to the signal lines X in accordance with a timing signal XT. The image data Vs that is output to the signal lines X from the signal line driving circuit SD is applied to the pixel electrodes PE via the pixel switches SW.

Figure 8:
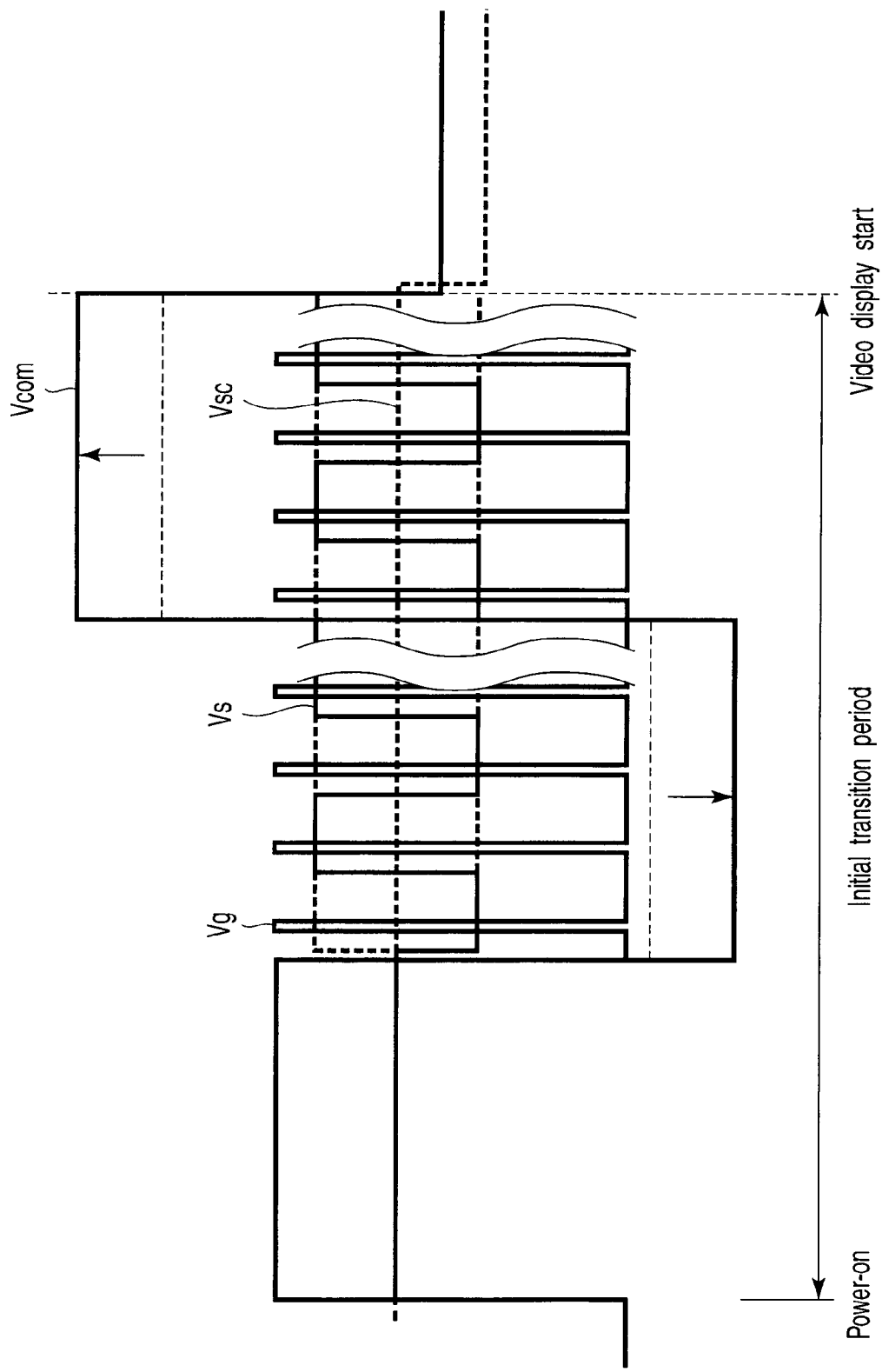
FIG. 8 is a view for explaining an example of the operation of a controller of the liquid crystal display device shown in FIG. 1.

At the time of initializing the liquid crystal display device, as shown in FIG. 8, the initialization control unit CI of the controller CTR sends the scanning signal Vg, image data Vs and a common signal Vcom to the liquid crystal display panel 10. At this time, the initialization control unit CI of the controller CTR causes the sensor S to measure the temperature of the outside, and controls the magnitude of the common signal Vcom, which is to be sent to the liquid crystal display panel 10, on the basis of the measurement result of the sensor S.

To be more specific, if the outside temperature decreases, the viscosity of the liquid crystal material increases and the variation in alignment state of liquid crystal molecules is suppressed. Thus, when the temperature measured by the sensor S is lower than a predetermined temperature, the initialization control unit CI increases the value of the common signal Vcom, relative to a central value Vsc of the image data Vs. In short, the value of |Vcom−Vsc| is increased.

Thereby, when the viscosity of the liquid crystal material is high, the voltage that is applied to the liquid crystal layer LQ, which is held between the pixel electrodes PE and counter-electrode CE, is increased. In other words, since the voltage for transitioning the alignment state of liquid crystal molecules from the non-display state to the display state increases, the time that is needed for the transition of the alignment state of the liquid crystal molecules is decreased.

Therefore, the present embodiment can provide the liquid crystal display device which is capable of decreasing the time that is needed for initialization in the OCB mode liquid crystal display device and, in particular, decreasing the time for the initial transition even in the low-temperature environment.

Next, a liquid crystal display device according to a second embodiment of the invention is described with reference to the accompanying drawings. In the description below, the structural parts common to those in the first embodiment are denoted by like reference numerals, and a description thereof is omitted.

Like the above-described liquid crystal display device of the first embodiment, the liquid crystal display device according to the present second embodiment includes a transition-nucleus formation section A1 on a terminal-end side of the rubbing direction D1 in each display pixel PX. Specifically, in the liquid crystal display device of the present embodiment, the transition-nucleus formation section A1 is provided at a side edge portion PE1 on the terminal-end side of the rubbing direction D1, which corresponds to a short side of the rectangular display pixel PX.

The transition-nucleus formation section A1 is composed of a recess portion PEA of the pixel electrode PE, and a wiring line, namely, the scanning line Y, which is partly opposed to the recess portion PEA via an insulation layer and has a potential different from the potential of the pixel electrode PE. The recess portion PEA of the pixel electrode PE is disposed such that at least a part of the pixel electrode PE is opposed to the scanning line Y via the insulation layer.

Figure 9:
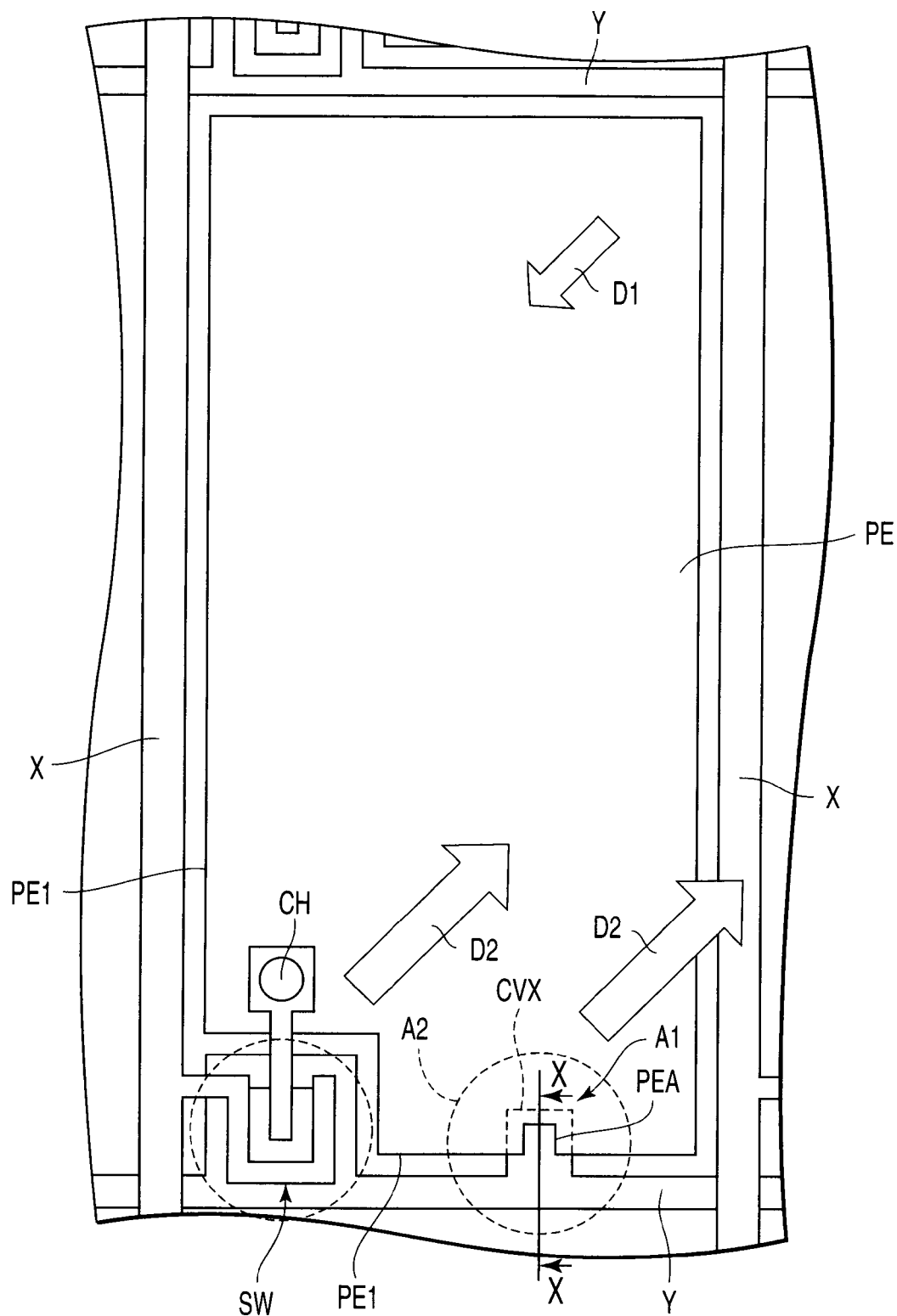
FIG. 9 is a view for describing an example of the structure of a display pixel of a liquid crystal display device according to a second embodiment of the invention.

Specifically, the pixel electrode PE has the recess portion PEA at the edge portion PE1 which corresponds to the short side of the pixel electrode PE and is located on the terminal-end side of the rubbing direction D1. As shown in FIG. 9 and FIG. 10, the scanning line Y has a projection portion CVX which extends towards the edge portion PE1 of the pixel electrode PE. The recess portion PEA of the pixel electrode PE and the projection portion CVX of the scanning line Y are disposed to be, at least partly, opposed to each other via an insulating layer.

Like the case of FIG. 5, if the recess portion PEA of the pixel electrode PE and the projection portion CVX of the scanning line Y are disposed in the transition-nucleus formation section A1 as described above, an electric field is generated in directions substantially perpendicular to the end sides of the recess portion PEA of the pixel electrode PE. Then, a transition nucleus A2 is formed at a position where the recess portion PEA of the pixel electrode PE and the projection portion CVX of the scanning line Y overlap, that is, at the position of the transition-nucleus formation section A1. At the time of initialization, the transition of the alignment state is facilitated by the transition nucleus A2.

In this case, like the above-described first embodiment, the speed of progress of the transition in the display pixel is highest in a direction D2 opposite to the rubbing direction D1. Accordingly, since the transition-nucleus formation section A1 is provided on the terminal-end side of the rubbing direction D1 in each display pixel PX, the time that is needed for the initialization can be decreased.

Therefore, according to the present embodiment, the time that is needed for initialization in the OCB mode liquid crystal display device can be decreased. Moreover, like the first embodiment, in the case where the controller CTR includes the initialization control unit CI, the liquid crystal display device, wherein the time for the initial transition can be decreased even in the low-temperature environment, can be provided.

Next, a third embodiment of the present invention is described with reference to the accompanying drawings.

Like the above-described liquid crystal display device of the first embodiment, the liquid crystal display device according to the present third embodiment includes a transition-nucleus formation section A1 on a terminal-end side of the rubbing direction D1 in each display pixel PX. Specifically, in the liquid crystal display device of the present embodiment, the transition-nucleus formation section A1 is provided at a side edge portion PE1 on the terminal-end side of the rubbing direction D1 of the alignment film, which corresponds to a long side of the rectangular display pixel PX.

Figure 11:
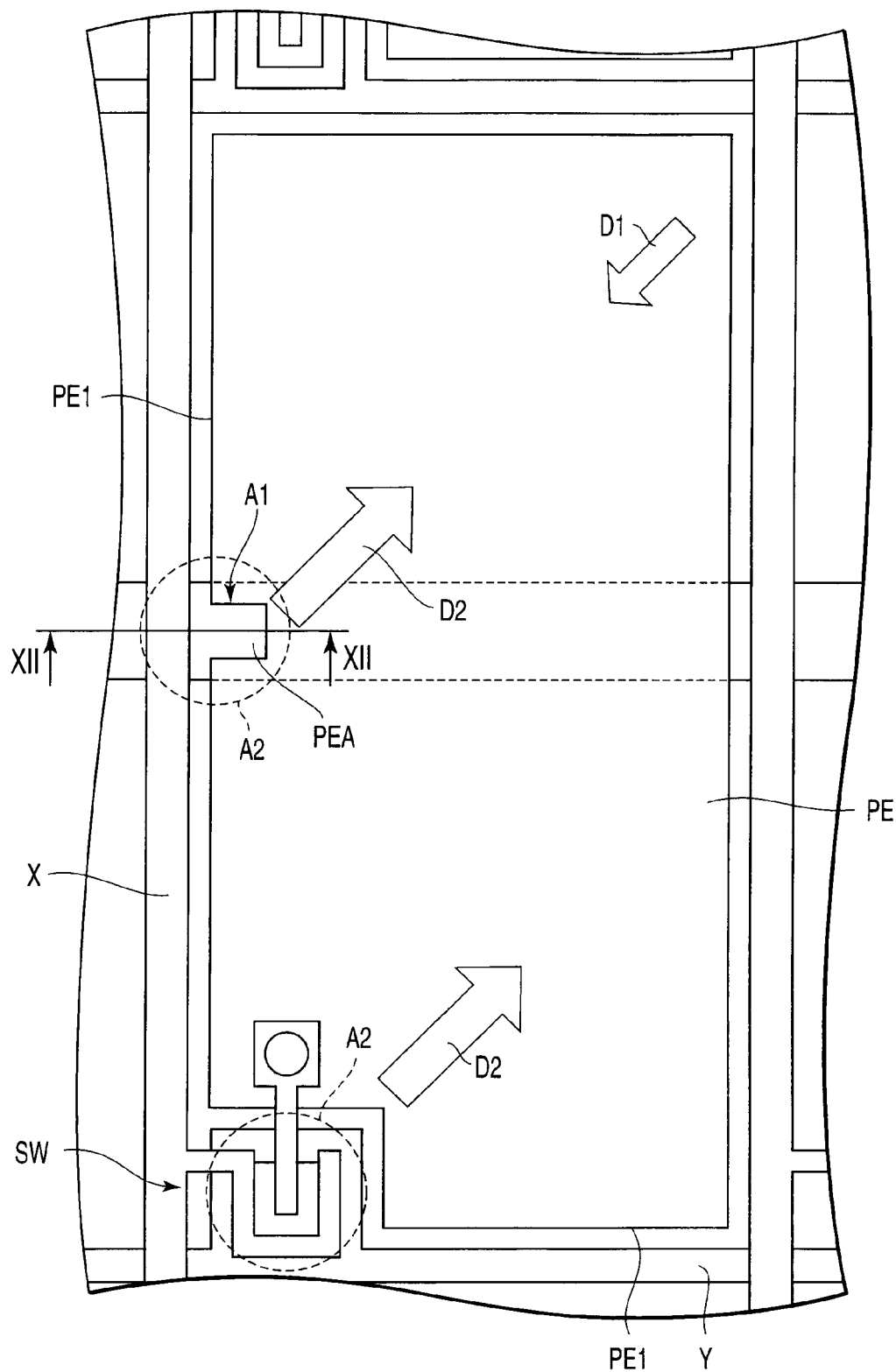
FIG. 11 is a view for describing an example of the structure of a display pixel of a liquid crystal display device according to a third embodiment of the invention.

The transition-nucleus formation section A1 is composed of a recess portion PEA of the pixel electrode PE, and a wiring line, namely, a storage capacitance line Cs, which is partly opposed to the recess portion PEA via an insulation layer and has a potential different from the potential of the pixel electrode PE. Specifically, as shown in FIG. 11, the liquid crystal display panel 10 of the liquid crystal display device according to the present embodiment includes the storage capacitance line Cs which extends substantially in parallel to the scanning line Y in the display section 10A. The storage capacitance line Cs is so disposed as to traverse the pixel electrode PE.

Like the first embodiment, the pixel electrode PE has the recess portion PEA at the edge portion PE1 on the terminal-end side of the rubbing direction D1 of the alignment film. The recess portion PEA is formed at a position where the storage capacitance line Cs is disposed. Specifically, as shown in FIG. 12, an insulation film is disposed on the storage capacitance line Cs, and the recess portion PEA of the pixel electrode PE and the storage capacitance line Cs are disposed to be opposed to each other via this insulation film.

If the storage capacitance line Cs and the recess portion PEA of the pixel electrode PE are disposed as described above, an electric field is generated in directions substantially perpendicular to the end sides of the recess portion PEA between the storage capacitance line Cs and the recess portion PEA of the pixel electrode PE, in the same manner as between the signal line X and pixel electrode PE in FIG. 5. Then, a transition nucleus A2 is formed at a position where the recess portion PEA of the pixel electrode PE and the storage capacitance line Cs overlap, that is, at the position of the transition-nucleus formation section A1. At the time of initialization, the transition of the alignment state is facilitated by the transition nucleus A2.

In this case, like the above-described first embodiment, the speed of progress of the transition in the display pixel is highest in a direction D2 opposite to the rubbing direction D1. Accordingly, since the transition-nucleus formation section A1 is provided on the terminal-end side of the rubbing direction D1 in each display pixel PX, the time that is needed for the initialization can be decreased.

Therefore, according to the present embodiment, like the first embodiment, the time that is needed for initialization in the OCB mode liquid crystal display device can be decreased. Moreover, like the first embodiment, in the case where the controller CTR includes the initialization control unit CI, the liquid crystal display device, wherein the time for the initial transition can be decreased even in the low-temperature environment, can be provided.

Next, a liquid crystal display device according to a fourth embodiment of the invention is described with reference to the accompanying drawings. Like the above-described liquid crystal display device of the first embodiment, the liquid crystal display device according to the present fourth embodiment includes transition-nucleus formation sections A1 on a terminal-end side of the rubbing direction D1 in each display pixel PX. In the liquid crystal display device of the present embodiment, transition-nucleus formation sections A1 are provided at a side edge portion PE1 on the terminal-end side of the rubbing direction D1 of the pixel electrode PE, which corresponds to one long side of the rectangular display pixel PX, and at a side edge portion on the starting-end side of the rubbing direction D1, which corresponds to the other long side of the rectangular display pixel PX.

Figure 13:
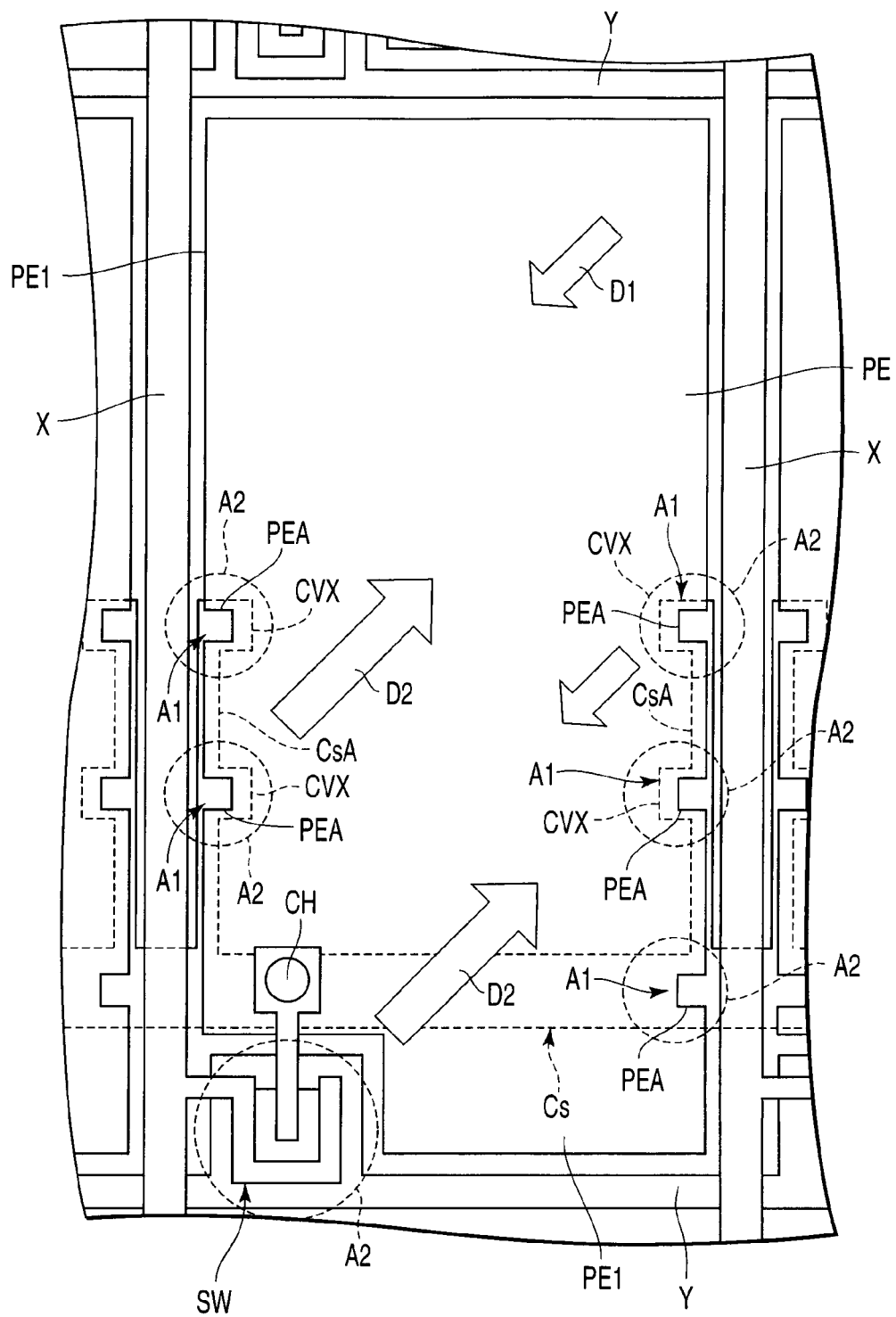
FIG. 13 is a view for describing an example of the structure of a display pixel of a liquid crystal display device according to a fourth embodiment of the invention.

The transition-nucleus formation section A1 is composed of a recess portion PEA of the pixel electrode PE, and a wiring line, namely, a storage capacitance line Cs, which has a potential different from the potential of the pixel electrode PE. Specifically, as shown in FIG. 13, the liquid crystal display panel 10 of the liquid crystal display device includes the storage capacitance line Cs which extends substantially in parallel to the scanning line Y in the display section 10A. The storage capacitance line Cs includes branch portions CsA which are arranged along the row of the display pixels PX. Specifically, as shown in FIG. 13, each branch portion CsA extends along the signal line X. The branch portion CsA includes a projection portion CVX which projects to the pixel electrode PE side.

The pixel electrode PE includes the projection portion CVX of the branch portion CsA of the storage capacitance line Cs and the recess portion PEA which is opposed to a part of the projection portion CVX. The recess portion PEA is formed at least at the side edge portion PE1 on the terminal-end side of the rubbing direction D1 of the pixel electrode PE. In the present embodiment, the recess portions PEA are formed at the two long sides of the pixel electrode PE.

Figure 14:
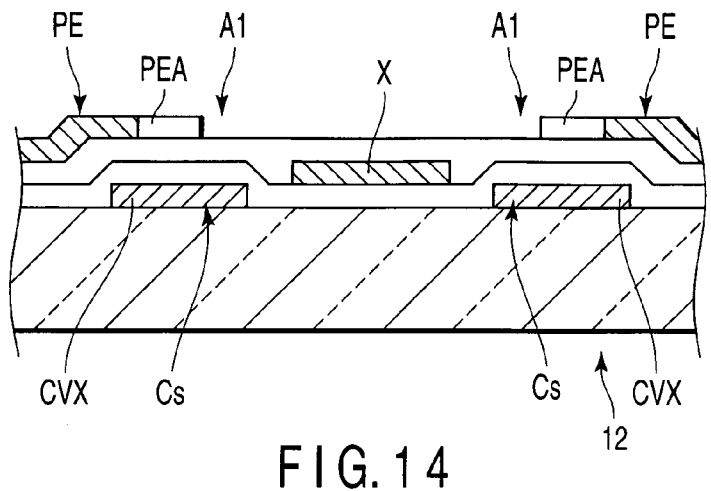
FIG. 14 is a cross-sectional view, taken along line XIV-XIV in FIG. 13, which schematically shows an example of the cross section of the display pixel shown in FIG. 13.

As shown in FIG. 14, an insulation film is disposed on the storage capacitance lines Cs, and the signal line X is disposed on the insulation film between the storage capacitance lines Cs. Another insulation film is disposed on the signal line X, and the projection portion CVX of the branch portion CsA and the recess portion PEA of the pixel electrode PE are disposed to be opposed to each other via this insulation film.

If the projection portion CVX of the branch portion CsA and the recess portion PEA of the pixel electrode PE are disposed as described above, an electric field is generated in directions substantially perpendicular to the end sides of the recess portion PEA between the projection portion CVX of the storage capacitance line Cs and the recess portion PEA of the pixel electrode PE, in the same manner as between the signal line X and the pixel electrode PE shown in FIG. 5. Then, a transition nucleus A2 is formed at a position where the projection portion CVX and the recess portion PEA are disposed, that is, at the position of the transition-nucleus formation section A1.

According to the present embodiment, like the first embodiment, the time that is needed for initialization in the OCB mode liquid crystal display device can be decreased. Moreover, like the first embodiment, in the case where the controller CTR includes the initialization control unit CI, the liquid crystal display device, wherein the time for the initial transition can be decreased even in the low-temperature environment, can be provided.

Besides, in the liquid crystal display device according to this embodiment, the storage capacitance line Cs has the branch portion CsA extending along the signal line X, as described above, and the transition-nucleus formation section A1 can be disposed along the branch portion CsA. Thus, compared to the above-described third embodiment, a plurality of transition-nucleus formation sections A1 can easily be disposed. Therefore, in each display pixel PX, a plurality of transition nuclei A2 can easily be formed, and the time that is needed for the initialization can be reduced.

Figure 15:
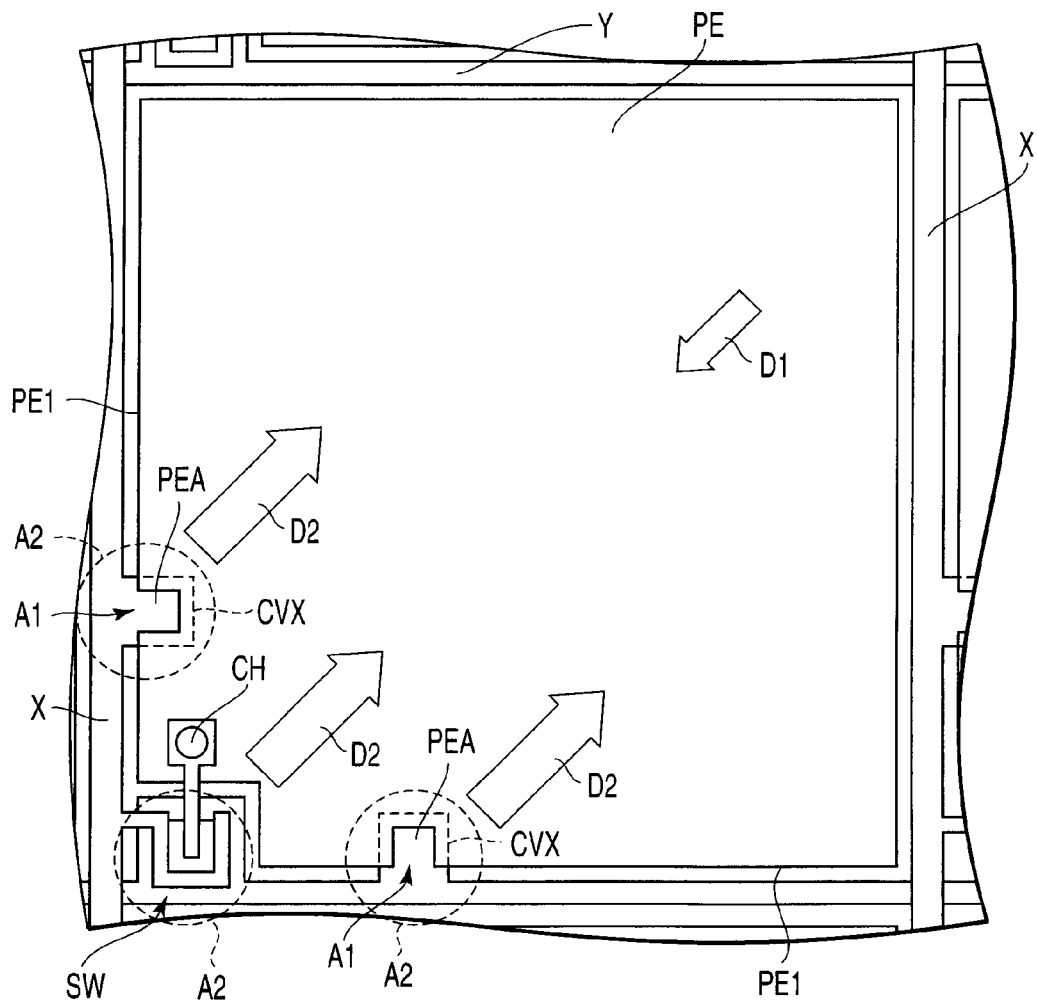
FIG. 15 is a view for describing an example of the structure of a display pixel of a liquid crystal display device according to a fifth embodiment of the invention.

Next, a liquid crystal display device according to a fifth embodiment of the invention is described with reference to the accompanying drawings. Like the above-described first embodiment, the liquid crystal display device according to the present fifth embodiment includes transition-nucleus formation sections A1 on terminal-end sides of the rubbing direction D1 in each display pixel PX. The liquid crystal display device of the present embodiment has a substantially rectangular pixel electrode PE in each display pixel PX, as shown in FIG. 15. In this embodiment, an end side extending substantially in parallel to the signal line X of the pixel electrode PE has a length that is substantially equal to the length of an end side extending substantially in parallel to the scanning line Y.

In this case, at least one recess portion PEA is disposed on the side edge PE1 on the terminal-end side of the rubbing direction of the alignment film. In the case of the present embodiment, as shown in FIG. 15, the pixel electrode PE has two side edges PE1 on the terminal-end side of the rubbing direction D1, and one transition-nucleus formation section A1 is disposed on each of the two side edges PE1.

The transition-nucleus formation sections A1 are composed of recess portions PEA of the pixel electrode PE, and wiring lines, namely, the signal line X and scanning line Y, which have potentials different from the potential of the pixel electrode PE. Specifically, the pixel electrode PE has the recess portions PEA at the side edges PE1 on the terminal-end side of the rubbing direction D1. The signal line X and scanning line Y, which extend along the side edges PE1 of the pixel electrode PE at which the recess portions PEA are disposed, have projection portions CVX at positions corresponding to the recess portions PEA of the pixel electrode PE. The recess portions PEA of the pixel electrode PE and the projection portions CVX of the signal line X and scanning line Y are disposed to be, at least partly, opposed via insulating layers.

In the case where each display pixel PX has the substantially rectangular pixel electrode PE having the side edges of the substantially same length as in the liquid crystal display device of this embodiment, if the pixel electrode PE, signal line X and scanning line Y are disposed as described above, an electric field is generated, like the case shown in FIG. 5, in directions substantially perpendicular to the end sides of the recess portion PEA between the projection portion CVX of the signal line X and the recess portion PEA of the pixel electrode PE and between the projection portion CVX of the scanning line Y and the recess portion PEA of the pixel electrode PE.

Then, a transition nucleus A2 is formed at a position where the projection portion CVX of the signal line X and the recess portion PEA of the pixel electrode PE are disposed and a position where the projection portion CVX of the scanning line Y and the recess portion PEA of the pixel electrode PE are disposed, that is, at the positions of the transition-nucleus formation sections A1.

In this case, like the above-described first embodiment, the speed of progress of the transition is highest in a direction D2 opposite to the rubbing direction D1. Accordingly, since the transition-nucleus formation sections A1 are provided on the terminal-end side of the rubbing direction D1 in each display pixel PX, the time that is needed for the initialization can be decreased.

In other words, in the case where the display pixel PX has the substantially rectangular pixel electrode PE having the side edges of the substantially same length as in the OCB mode liquid crystal display device of this embodiment, the time that is needed for initialization can effectively be decreased by the formation of the transition nucleus A2. Moreover, like the first embodiment, in the case where the controller CTR includes the initialization control unit CI, the liquid crystal display device, wherein the time for the initial transition can be decreased even in the low-temperature environment, can be provided.

Figure 16:
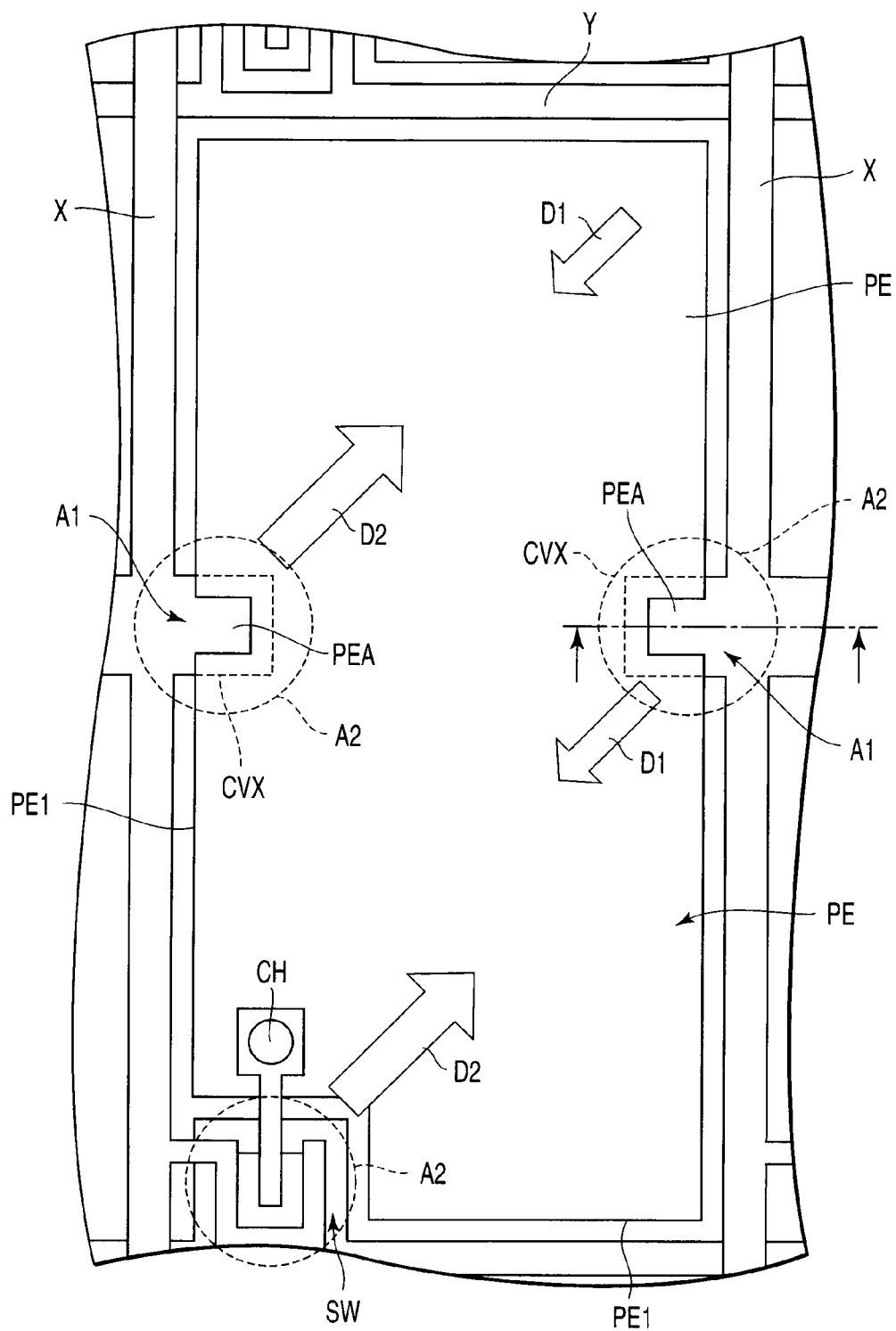
FIG. 16 is a view for describing an example of the structure of a display pixel of a liquid crystal display device according to a sixth embodiment of the invention.

Next, a liquid crystal display device according to a sixth embodiment of the invention is described with reference to the accompanying drawings. Like the liquid crystal display device according the above-described first embodiment, the liquid crystal display device according to the present sixth embodiment includes a transition-nucleus formation section A1, at least, on the terminal-end side of the rubbing direction D1 in each display pixel PX. In the liquid crystal display device of the present embodiment, as shown in FIG. 16, transition-nucleus formation sections A1 are provided, respectively, on the terminal-end side and starting-end side of the rubbing direction D1.

The transition-nucleus formation section A1 is composed of a recess portion PEA of the pixel electrode PE, and a wiring line, namely, the signal line X, which has a potential different from the potential of the pixel electrode PE. Specifically, as shown in FIG. 16, the liquid crystal display device according to the present embodiment has a substantially rectangular pixel electrode PE. Like the first embodiment, the pixel electrode PE has the recess portion PEA at an edge portion PE1, which is located on the terminal-end side of the rubbing direction D1 of the alignment film and corresponds to one long side of the pixel electrode PE.

Further, the pixel electrode PE has the recess portion PEA at an edge portion, which is located not on the terminal-end side of the rubbing direction D1 of the alignment film and which corresponds to the other long side of the pixel electrode PE. In short, the recess portions PEA are disposed, respectively, on the two long sides of the pixel electrode PE.

The signal line X, which extends along the side edge of the pixel electrode PE, at which the recess portion PEA is disposed, has a projection portion CVX at a position overlapping the recess portion PEA. In other words, the recess portion PEA of the pixel electrode PE and the projection portion CVX of the signal line X are disposed to be, at least partly, opposed to each other via an insulating layer.

If the pixel electrode PE and the signal line X are disposed as described above, an electric field is generated in directions substantially perpendicular to the end sides of the recess portion PEA between the signal line X and the recess portion PEA of the pixel electrode PE, as in the case shown in FIG. 5. Then, transition nuclei A2 are formed at positions where the recess portions PEA of the pixel electrode PE and the projection portions CVX of the signal lines X are disposed, that is, at the positions of the transition-nucleus formation sections A1 on the terminal-end side and starting-end side of the rubbing direction D1 of each display pixel PX.

In this case, like the above-described first embodiment, the speed of progress of the transition in the display pixel is highest in a direction D2 opposite to the rubbing direction D1. Accordingly, since the transition-nucleus formation sections A1 are provided on the terminal-end side and starting-end side of the rubbing direction D1 in each display pixel PX, the time that is needed for the initialization can be decreased.

Besides, like the first embodiment, in the case where the controller CTR includes the initialization control unit CI, the liquid crystal display device, wherein the time for the initial transition can be decreased even in the low-temperature environment, can be provided.

Next, a liquid crystal display device according to a seventh embodiment of the invention is described with reference to the accompanying drawings. Like the liquid crystal display device according the above-described first embodiment, the liquid crystal display device according to the present seventh embodiment includes a transition-nucleus formation section A1 on the terminal-end side of the rubbing direction D1 in each display pixel PX. Specifically, in the liquid crystal display device of the present embodiment, two transition-nucleus formation sections A1 are provided at a long-side edge portion PE1 on the terminal-end side of the rubbing direction D1 in each display pixel PX.

Figure 17:
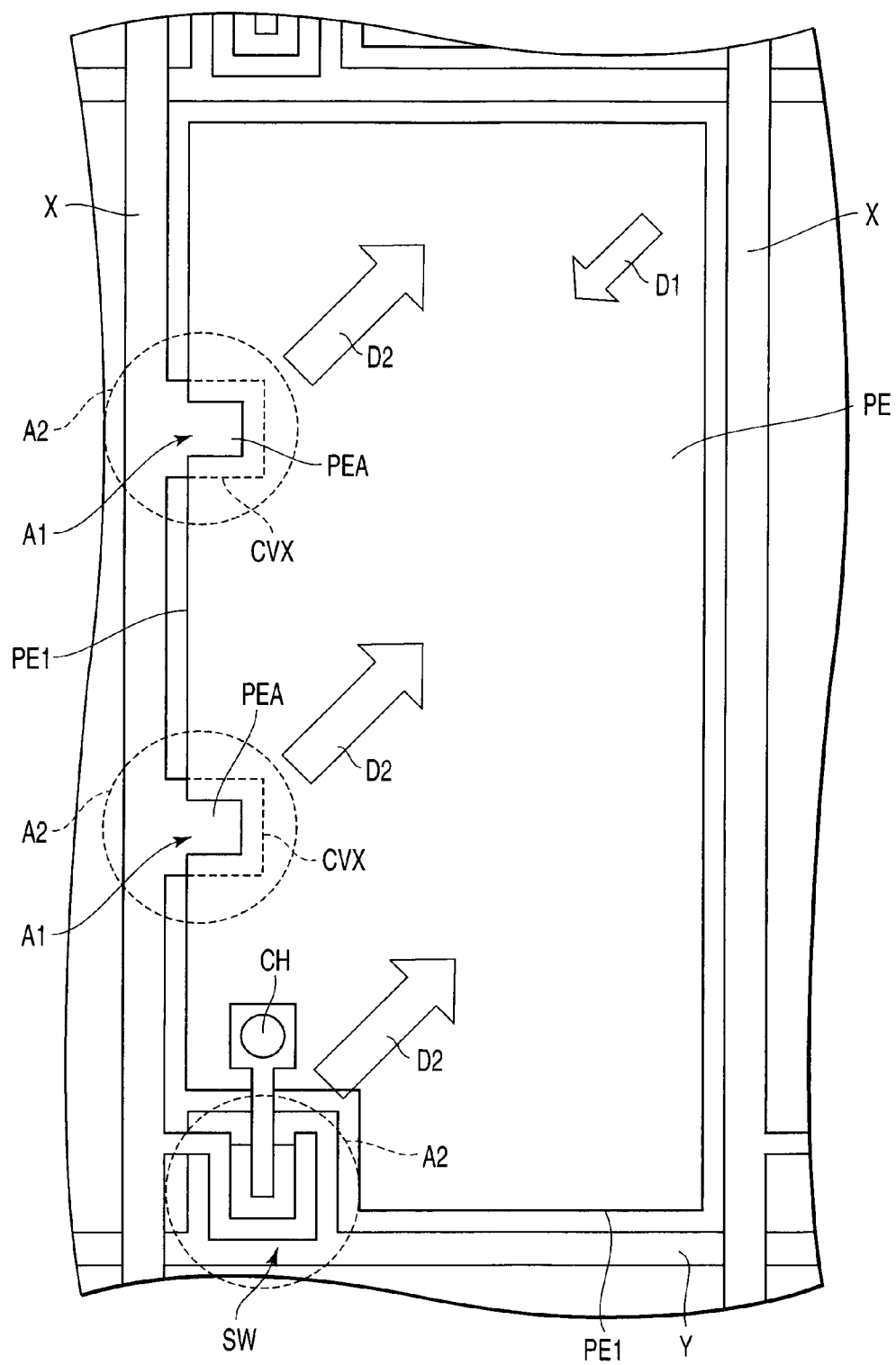
FIG. 17 is a view for describing an example of the structure of a display pixel of a liquid crystal display device according to a seventh embodiment of the invention.

Each transition-nucleus formation section A1 is composed of a recess portion PEA of the pixel electrode PE, and a wiring line, namely, the signal line X, which has a potential different from the potential of the pixel electrode PE. Specifically, as shown in FIG. 17, the liquid crystal display device according to the present embodiment has a substantially rectangular pixel electrode PE. The pixel electrode PE has two recess portions PEA at the long-side edge portion PE1 on the terminal-end side of the rubbing direction D1 of the alignment film. The two recess portions PEA are disposed equidistantly on the edge portion PE1. In other words, in the case of the present embodiment, the recess portions PEA are arranged such that the distance between each recess portion PEA and the short side of the pixel electrode PE, which is closest to the recess portion PEA, is substantially equal to the distance between the recess portions PEA.

The signal line X has a projection portion CVX at a position corresponding to the recess portion PEA of the pixel electrode PE. In other words, the recess portion PEA of the pixel electrode PE and the projection portion CVX of the signal line X are disposed to be partly opposed to each other via an insulating layer.

If the recess portion PEA of the pixel electrode PE and the projection portion CVX of the signal line X are disposed as described above, an electric field is generated in directions substantially perpendicular to the end sides of the recess portion PEA between the projection portion CVX of the signal line X and the recess portion PEA of the pixel electrode PE, as in the case shown in FIG. 5. Thus, in the present embodiment, transition nuclei A2 are formed at positions where the recess portions PEA of the pixel electrode PE and the projection portions of the signal lines X are disposed, that is, at the positions of the transition-nucleus formation sections A1.

In this case, like the above-described first embodiment, the speed of progress of the transition in the display pixel is highest in a direction D2 opposite to the rubbing direction D1. Accordingly, since the two transition-nucleus formation sections A1 are provided equidistantly on the terminal-end side of the rubbing direction D1 in each display pixel PX and the transition nuclei A2 are formed at the positions of the transition-nucleus formation sections A1, the time that is needed for the initialization can be made shorter than in the first embodiment.

Besides, like the first embodiment, in the case where the controller CTR includes the initialization control unit CI, the liquid crystal display device, wherein the time for the initial transition can be decreased even in the low-temperature environment, can be provided.

Next, a liquid crystal display device according to an eighth embodiment of the invention is described with reference to the accompanying drawings. Like the liquid crystal display device according the above-described first embodiment, the liquid crystal display device according to the present eighth embodiment includes a transition-nucleus formation section A1 on the terminal-end side of the rubbing direction D1 in each display pixel PX. Specifically, the transition-nucleus formation section A1 is provided at a long-side edge portion PE1 on the terminal-end side of the rubbing direction D1 of each display pixel PX.

The transition-nucleus formation section A1 is provided at such a position that the distance between the transition-nucleus formation section A1 and an intersection between the long side and one short side of the rectangular display pixel PX, that is, one end of the long side at which the long side intersects the short side, is shorter than the distance between the transition-nucleus formation section A1 and the other end of the long side. In other words, the transition-nucleus formation section A1 is disposed such that the distance between the transition-nucleus formation section A1 and one end of the long side of the pixel electrode PE at which the long side intersects the short side and at which the pixel switch SW is disposed, is shorter than the distance between the transition-nucleus formation section A1 and the other end of the long side. To be more specific, the transition-nucleus formation section A1 is disposed such that the distance between the transition-nucleus formation section A1 and an intersection of the two side edges PE1 on the terminal-end side of the rubbing direction D1 is shorter than the distance between the transition-nucleus formation section A1 and the other end of the long side which is located opposite to the intersection of the two side edges PE1.

Figure 18:
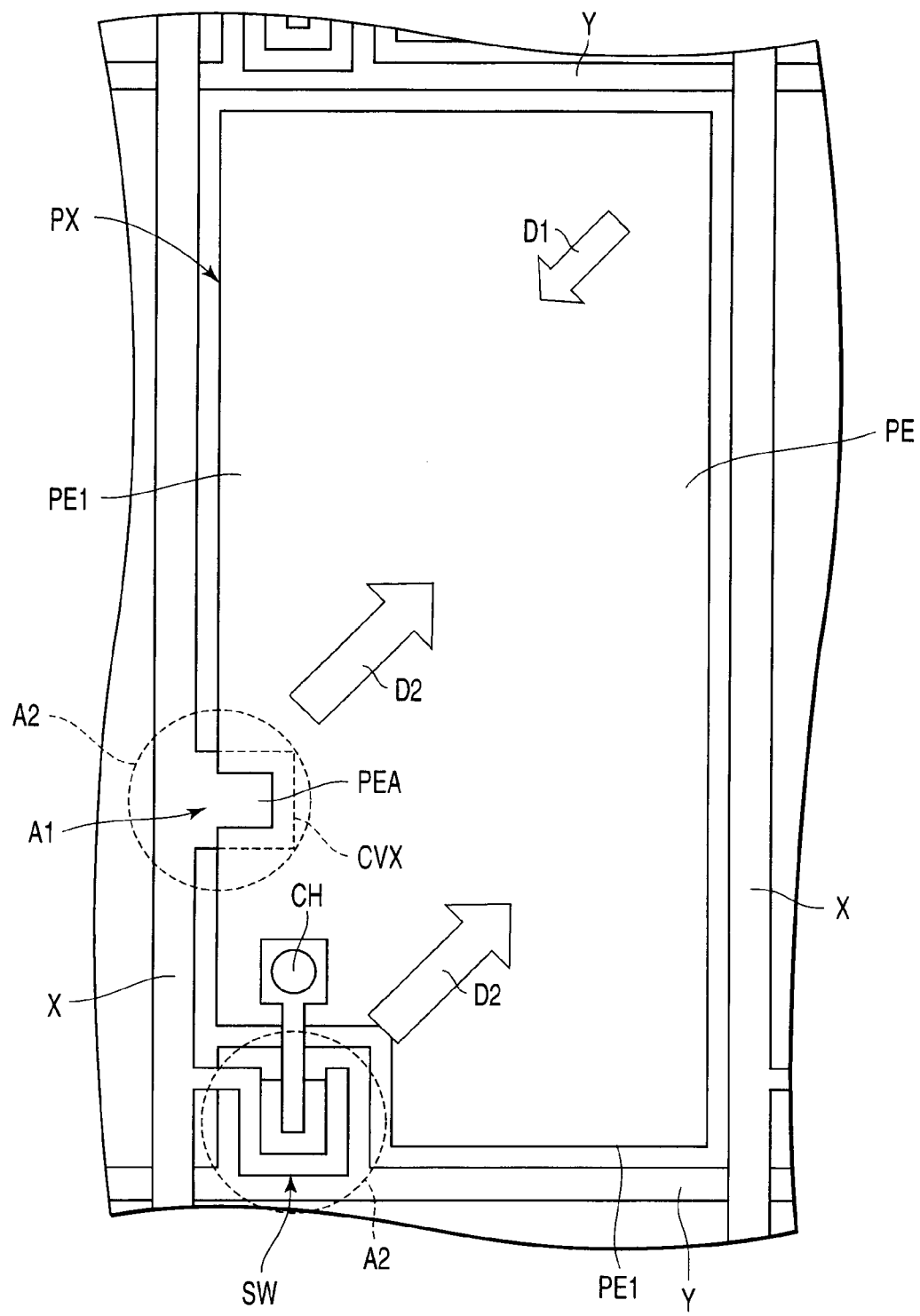
FIG. 18 is a view for describing an example of the structure of a display pixel of a liquid crystal display device according to an eighth embodiment of the invention.

The transition-nucleus formation section A1 is composed of a recess portion PEA of the pixel electrode PE, and a wiring line, namely, the signal line X, which has a potential different from the potential of the pixel electrode PE. Specifically, as shown in FIG. 18, the liquid crystal display device according to the present embodiment has the recess portion PEA at the edge portion PE1 on the terminal-end side of the rubbing direction D1 of the pixel electrode PE. The signal line X has a projection portion CVX at a position corresponding to the recess portion PEA of the pixel electrode PE. In other words, the recess portion PEA of the pixel electrode PE and the projection portion CVX of the signal line X are disposed to be partly opposed to each other via an insulating layer.

If the recess portion PEA of the pixel electrode PE and the projection portion CVX of the signal line X are disposed as described above, an electric field is generated in directions substantially perpendicular to the end sides of the recess portion PEA between the projection portion CVX of the signal line X and the recess portion PEA of the pixel electrode PE, as in the case shown in FIG. 5. Thus, in the present embodiment, a transition nucleus A2 is formed at a position where the recess portions PEA of the pixel electrode PE and the projection portion CVX of the signal line X are disposed, that is, at the position of the transition-nucleus formation section A1.

In this case, like the above-described first embodiment, the speed of progress of the transition is highest in a direction D2 opposite to the rubbing direction D1. Accordingly, since the transition-nucleus formation section A1 is provided on the terminal-end side of the rubbing direction D1 in each display pixel PX and the transition nucleus A2 is formed at the position of the transition-nucleus formation section A1, the time that is needed for the initialization can be decreased In this embodiment, the transition-nucleus formation section A1 is not equidistantly provided on the edge portion on the terminal-end side of the rubbing direction A1, and the transition-nucleus formation section A1 is disposed such that the distance between the transition-nucleus formation section A1 and the intersection of the two side edges PE1 is less than the distance between the transition-nucleus formation section A1 and the other end of the long side that is located opposite to the intersection. Thereby, the distance between the transition nucleus A2 and the end portion of the display pixel PX in the direction D2, in which the speed of progress of the transition becomes highest, is increased, and the time that is needed for the initialization can be reduced.

Figure 19:
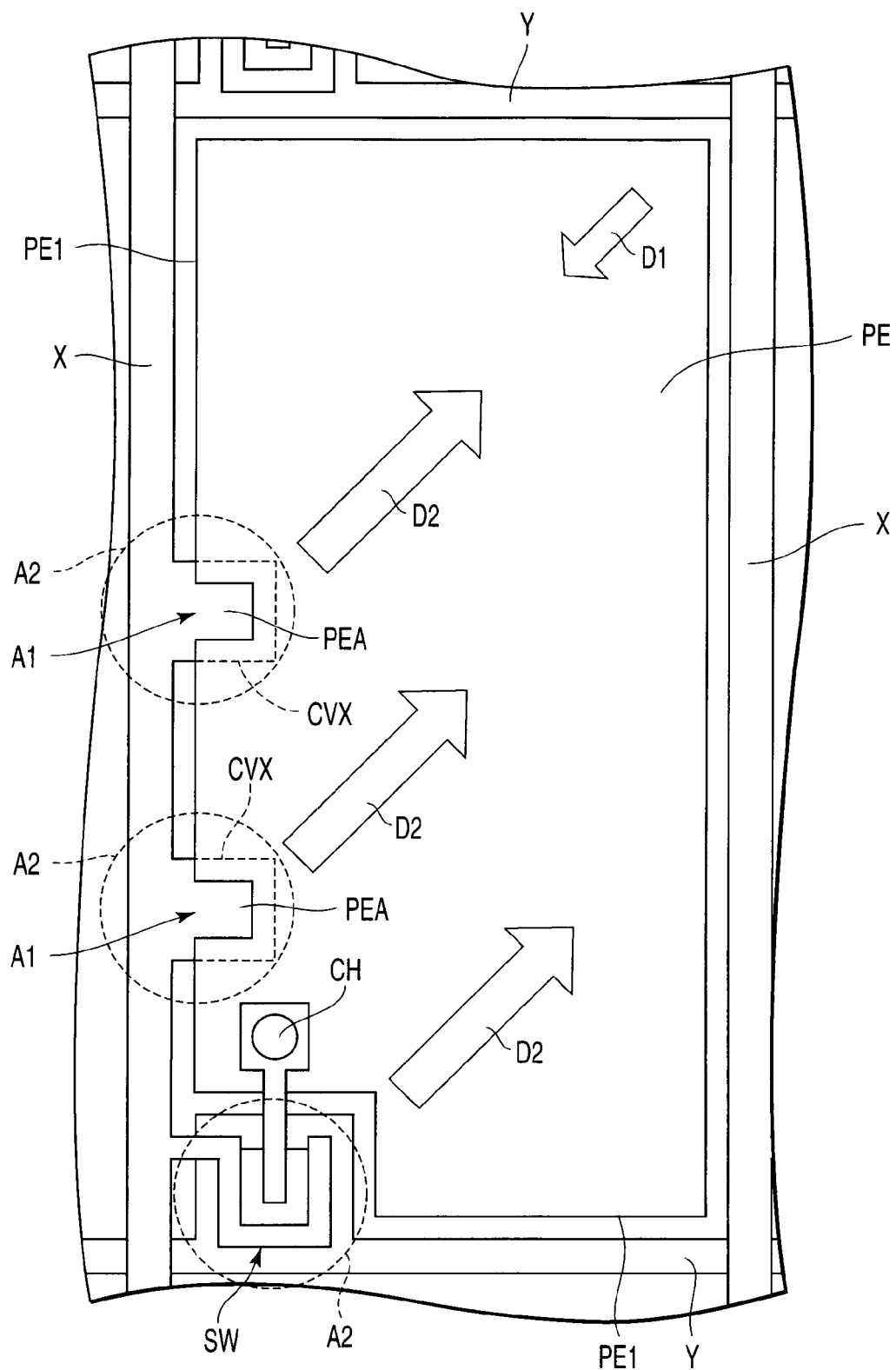
FIG. 19 is a view for describing another example of the structure of the display pixel of the liquid crystal display device according to the eighth embodiment of the invention.

The above description is directed to the case in which one transition-nucleus formation section A1 is provided in each display pixel PX. However, this embodiment is also applicable to the case in which a plurality of transition-nucleus formation sections A1 are provided, as shown in FIG. 19. In this case, too, the same advantageous effect as in the case where the number of transition-nucleus formation sections A1 is one can be obtained by providing the plural transition-nucleus formation sections A1 at such positions that the distance between each transition-nucleus formation section A1 and one end of the long side, where the long side intersects the short side, is less than the distance between each transition-nucleus formation section A1 and the other end of the long side.

Besides, like the first embodiment, in the case where the controller CTR includes the initialization control unit CI, the liquid crystal display device, wherein the time for the initial transition can be decreased even in the low-temperature environment, can be provided.

As has been described above, the present invention can provide the liquid crystal display device which is capable of decreasing the time that is needed for initializing the OCB mode liquid crystal display device and, in particular, decreasing the time for the initialization even in the low-temperature environment.

The present invention is not limited directly to the above-described embodiments. In practice, the structural elements can be modified without departing from the spirit of the invention.

Figure 20:
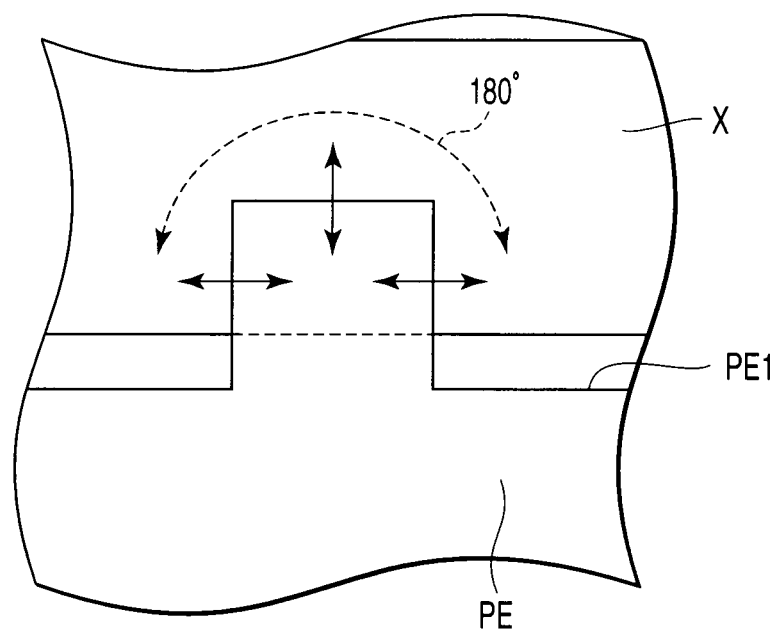
FIG. 20 is a view for describing another example of the structure of the transition-nucleus formation section of display the pixel of the liquid crystal display device according to the present invention.

For example, in each of the liquid crystal display devices according to the embodiments, the transition nucleus A2 for facilitating the transition of the alignment state is formed at the position where the recess portion PEA of the pixel electrode PE and the projection portion CVX of the other conductor layer, such as the signal line X, overlap. However, the structure by which the transition nucleus A2 is formed is not limited to this example. For instance, as shown in FIG. 20, a projection portion CVX may be formed at the pixel electrode PE, and the projection portion CVX may be disposed to overlap another conductive layer such as the signal line X. Thereby, like the case shown in FIG. 5, electric fields are generated in directions substantially perpendicular to end sides of the projection portion CVX of the pixel electrode PE, and the transition nucleus A2 is formed. Thus, in each of the embodiments, the same advantageous effects can be obtained by disposing the projection portion CVX of the pixel electrode PE and the other conductive layer as shown in FIG. 20.

Figure 21:
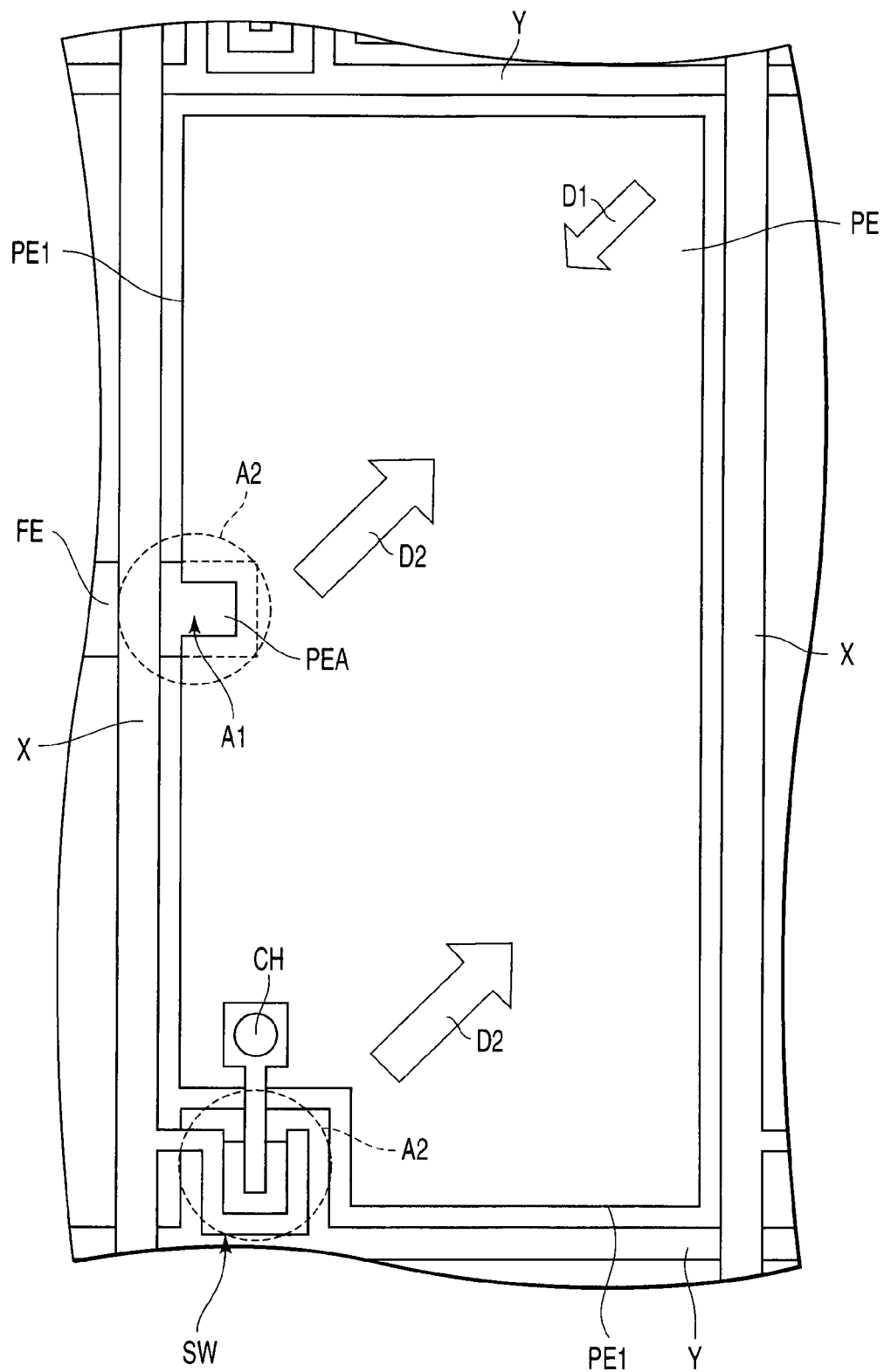
FIG. 21 is a view for describing another example of the structure of the display pixel of the liquid crystal display device according to the invention.

In each of the liquid crystal display devices according to the embodiments, the transition nucleus A2 is formed by disposing the recess portion PEA of the pixel electrode PE such that the recess portion PEA overlaps the signal line X, scanning line Y or storage capacitance line Cs. It should suffice if the recess portion of the pixel electrode PE is disposed to overlap some other electrically conductive layer. For example, as shown in FIG. 21, the recess portion PEA may be disposed to overlap an insular electrically conductive layer FE to which no particular signal is applied. In this case, too, the same advantageous effects as in each of the liquid crystal display devices according to the embodiments can be obtained.

Various inventions can be made by properly combining the structural elements disclosed in the embodiments. For example, some structural elements may be omitted from all the structural elements disclosed in the embodiments. Furthermore, structural elements in different embodiments may properly be combined.

What is claimed is:

1. A liquid crystal display device of an OCB mode, comprising:
   a liquid crystal layer held between a first substrate and a second substrate, and
   a display section composed of a plurality of display pixels arrayed in a matrix,
   wherein the first substrate includes a plurality of pixel electrodes which are disposed in association with the plurality of display pixels,
   the second substrate includes a counter-electrode which is opposed to the plurality of pixel electrodes including a recess portion in a transition-nucleus formation section,
   the first substrate and the second substrate include a pair of alignment films which are disposed on the pixel electrodes and the counter-electrode, respectively, and are subjected to rubbing treatment to control an alignment state of liquid crystal molecules included in the liquid crystal layer,
   the transition-nucleus formation section, which generates an electric field for transitioning the alignment state of the liquid crystal molecules included in the liquid crystal layer from a non-display state to a display state, is provided on a terminal-end side of a rubbing direction of each of the alignment films in each of the display pixels, and includes the pixel electrode and a wiring line having a potential different from a potential of the pixel electrode and opposed, at least partly, to the pixel electrode to overlap each other via an insulation layer, and
   the wiring line includes a projection portion, and end sides of the pixel electrode along the recess portion are disposed on the projection portion of the wiring line via the insulation layer.

2. The liquid crystal display device according to claim 1, wherein the transition-nucleus formation section is provided within the display pixel in the vicinity of a long side, the display pixel being a substantially rectangular shape.

3. The liquid crystal display device according to claim 1, wherein the transition-nucleus formation section is provided within the display pixel in the vicinity of a short side, the display pixel being a substantially rectangular shape.

4. The liquid crystal display device according to claim 1, wherein the transition-nucleus formation section is additionally provided on a starting-end side of the rubbing direction.

5. The liquid crystal display device according to claim 1, wherein a plurality of said transition-nucleus formation sections are provided equidistantly.

6. The liquid crystal display device according to claim 1, wherein the transition-nucleus formation section is provided on a side of an intersection between a long side and a short side of the display pixel which has a substantially rectangular shape.

7. The liquid crystal display device according to claim 6, wherein the transition-nucleus formation section is provided at such a position that a distance between the transition-nucleus formation section and one end of the long side, at which the long side and the short side intersect, is less than a distance between the transition-nucleus formation section and the other end of the long side.

8. The liquid crystal display device according to claim 1, wherein the pixel electrode includes a projection portion in the transition-nucleus formation section, and the wiring line is disposed to overlap the projection portion.

9. The liquid crystal display device according to claim 1, wherein the wiring line is at least one of a signal line which is disposed along a column of the display pixels, a scanning line which is disposed along a row of the display pixels, and a storage capacitance line which is disposed to be substantially parallel to the scanning line.

10. The liquid crystal display device according to claim 9, wherein the storage capacitance line has a branch portion extending along the column of the display pixels.

11. The liquid crystal display device according to claim 9, wherein the rubbing direction is set to be a direction crossing the scanning line and the signal line.

12. The liquid crystal display device according to claim 1, further comprising:
    measuring means for measuring an outside temperature; and
    a controller which controls a voltage, which is to be applied to the counter-electrode, in a case where the temperature measured by the measuring means is lower than a predetermined value when the alignment state of the liquid crystal molecules is to be transitioned to the display state, thereby making a voltage, which is to be applied to the liquid crystal layer, higher than a preset voltage at a time of the predetermined temperature.

13. The liquid crystal display device according to claim 12, wherein the controller includes means for controlling, in a case where the temperature measured by the measuring means is lower than the predetermined value, the voltage which is to be applied to the counter-electrode, thereby to increase a difference between the value of the voltage applied to the counter-electrode and a central value of a voltage that is applied to the pixel electrode.

* * * * *